US008519587B2

(12) United States Patent
Tatsuda (10) Patent No.: US 8,519,587 B2
(45) Date of Patent: Aug. 27, 2013

(54) ANGULAR INDEXING APPARATUS FOR MACHINE TOOL (75) Inventor: Yoshinori Tatsuda, Kanazawa (JP)

(73) Assignee: Tsudakoma Kogyo Kabushiki Kaisha, Kanazawa-shi, Ishikawa-ken (JP)

( * ) Notice: Subject to any disclaimer, the term of this patent is extended or adjusted under 35 U.S.C. 154(b) by 769 days.

(21) Appl. No.: 12/598,978

(22) PCT Filed: May 13, 2008

(86) PCT No.: PCT/JP2008/058751
§ 371 (c)(1),
(2), (4) Date: Mar. 18, 2010

(87) PCT Pub. No.: WO2008/143053
PCT Pub. Date: Nov. 27, 2008

(65) Prior Publication Data
US 2010/0329807 A1 Dec. 30, 2010

(30) Foreign Application Priority Data

May 14, 2007 (JP) ................................. 2007-128316

(51) Int. Cl.
*H02K 7/20* (2006.01)
*H02K 11/00* (2006.01)
*B23Q 1/54* (2006.01)
*B23C 1/00* (2006.01)

(52) U.S. Cl.
USPC ............. 310/112; 310/71; 409/201; 409/230; 409/231

(58) Field of Classification Search
USPC .................... 310/112, 71; 409/201, 230, 231
See application file for complete search history.

(56) References Cited

U.S. PATENT DOCUMENTS

| 5,584,621 | A | * | 12/1996 | Bertsche et al. | 409/201 |
| 5,636,949 | A | * | 6/1997 | Nakamura et al. | 409/230 |
| 6,746,188 | B2 | * | 6/2004 | Watanabe | 409/201 |
| 6,752,750 | B2 | * | 6/2004 | Adachi et al. | 483/31 |

(Continued)

FOREIGN PATENT DOCUMENTS

JP 2-116437 A 5/1990
JP 4-289042 A 10/1992

(Continued)

OTHER PUBLICATIONS

Translation of foreign document JP 2003170326.*

(Continued)

*Primary Examiner* — Tran Nguyen
*Assistant Examiner* — Alex W Mok
(74) *Attorney, Agent, or Firm* — Westerman, Hattori, Daniels & Adrian, LLP (57) ABSTRACT An angular indexing apparatus for a machine tool includes a rotating shaft to which a rotationally driven member is secured; a housing, surrounding the outer periphery of the rotating shaft and mounted to and removed from the body of the machine tool; bearings disposed between the housing and the rotating shaft, and driving means disposed between the housing and the rotating shaft and rotating the rotating shaft to index an angular position. The driving means includes drive motors, each including a motor rotor and a motor stator concentrically disposed around the rotating shaft in the housing. The housing has wiring holes in a thick-walled internal portion of an outer cylinder surrounding the outer periphery of the rotating shaft. The wiring holes are provided along an axial direction of the rotating shaft. The wiring holes receive at least upstream portions in entire lengths in a drawing-out direction of cables connected to the driving motors.

3 Claims, 6 Drawing Sheets

(56) References Cited

U.S. PATENT DOCUMENTS

| | | | |
|---|---|---|---|
| 7,004,693 B2* | 2/2006 | Adachi et al. | 409/144 |
| 7,488,147 B2* | 2/2009 | Yamazaki et al. | 409/231 |
| 2003/0073554 A1* | 4/2003 | Adachi et al. | 483/31 |
| 2003/0103826 A1 | 6/2003 | Watanabe | |

FOREIGN PATENT DOCUMENTS

| | | |
|---|---|---|
| JP | 08-174358 A | 7/1996 |
| JP | 2003-170326 A | 6/2003 |
| JP | 2006-102906 A | 4/2006 |

OTHER PUBLICATIONS

Translation of foreign document JP 2006102906.*
International Search Report for PCT/JP2008/058751, mailing date of Jul. 8, 2008.
Supplemental European Search Report dated Mar. 25, 2011, issued in corresponding European Patent Application No. 08752631.5.

* cited by examiner

ANGULAR INDEXING APPARATUS FOR MACHINE TOOL

TECHNICAL FIELD

The present invention relates to an angular indexing apparatus for a machine tool, and, more particularly, to an angular indexing apparatus used in, for example, a 5-axis machining apparatus (machining apparatus capable of simultaneous 5-axis control) or a rotating table apparatus.

BACKGROUND ART

In an example of an angular indexing apparatus for a machine tool, the following simultaneous 5-axis control machining apparatus is known. The machining apparatus is a parallel supporting type in which a rotating drive motor that indexes an angle is built in a head supporting section, the lower portion of a vertical head is connected to the lower portion of an oblique drive shaft that is rotated by the rotating drive motor, and a vertical tool main shaft is rotatably supported in the head. In addition, the rotating drive motor is one including a rotor and a stator, that is, what is called a DD motor (direct drive motor) is singly used (one DD motor is used) for it. (Patent Document 1)

In a different example of an angular indexing apparatus for a machine tool, there is known one in which a shaft, to whose one end an indexing table is mounted as a rotating indexing table, is rotatably supported in a casing and in which a DD motor is accommodated between the casing and the shaft. (Patent Document 2)

Although not discussed in the aforementioned patent documents, in general, a cable that is wired towards the outside of the apparatus is connected to the DD motor. Examples of the cable are a current supply cable for supplying current to a stator coil; a ground wire; and a detection wire for detecting abnormality of the drive motor. In addition, wiring methods of the cable generally include a first method in which the cable is passed through a space between the drive shaft and a housing (head supporting section, casing) that accommodates the DD motor, and a second method in which the cable is drawn out to an outer peripheral side of the housing from near a portion where the DD motor and the cable are connected to each other.

However, in the first method, when a component is provided between the housing and the drive shaft, there is no space for passing the cable, thereby forcing one to use the second method.

In the second method, when the cable in an exposed state is wired, the cable may become damaged. In particular, when the cable is exposed and wired near a portion where mounting and removal are performed with respect to a machine tool, the probability of the cable becoming damaged when performing the mounting and the removal with respect to the machine tool is high. In addition, since the cable is drawn out from near a portion where the DD motor and the cable are connected to each other, almost all of the cable is exposed, as a result of which the probability of the cable becoming damaged is high.

Accordingly, when the second method is used, if a protective cover for the cable is attached to the outer side of the housing, the outside diameter of the housing is correspondingly increased in size, which is not desirable. This is because, when the angular indexing apparatus is mounted to a predetermined mounting position of the existing machine tool, if the outside diameter of the housing is increased from a present outside diameter, the angular indexing apparatus cannot be mounted as it is to the existing machine tool, thereby making it necessary to modify the machine tool itself.

[Patent Document 1] Japanese Unexamined Patent Application Publication No. 2-116437 (page 9, lower column; FIG. 16)

[Patent Document 2] Japanese Unexamined Patent Application Publication No. 4-289042 (claims, FIG. 4)

DISCLOSURE OF INVENTION

Problems to be Solved by the Invention

The present invention is created considering the aforementioned circumstances. The present invention aims at, first, preventing, to the extent possible, damage to a cable being connected to a motor, which is built in a housing, and being drawn out to the outside; and, second, preventing the outside diameter of the housing having a motor built therein from becoming large due to wiring of a motor cable.

Means for Solving the Problems

The present invention presupposes the following: an angular indexing apparatus for a machine tool, including a rotating shaft, a housing, a bearing, and driving means, the rotating shaft having a member that is rotationally driven secured to one end thereof, the housing at least surrounding an outer periphery of the rotating shaft for supporting the rotating shaft, the housing being mountable to and removable from the machine tool, the bearing being accommodated between the housing and the rotating shaft, the driving means being provided between the housing and the rotating shaft, the driving means rotationally driving the rotating shaft to index an angular position thereof, wherein, as the driving means, a drive motor, including a motor rotor and a motor stator, is used, the motor rotor and the motor stator being concentrically disposed around the rotating shaft in the housing.

The following solving means is provided. The housing has a wiring hole provided in a thick-walled internal portion of an outer cylinder surrounding the outer periphery of the rotating shaft, the wiring hole receiving at least an upstream portion in an entire length in a drawing-out direction of a cable that is connected to the driving motor. The meaning of the phrase "the wiring hole being provided along an axial direction of the rotating shaft" is not limited to providing the wiring hole in a straight line so that the overall length of the wiring hole is parallel to the axial direction. The phrase may also mean that a hole that is partly large is provided, or that wiring holes are positionally displaced inwardly and outwardly with an axis of the rotating shaft being a center through the partly large hole, the wiring holes being provided on the front and back of the partly large hole.

The overall length in a drawing out direction of the cable refers to a length between a source and an end point when it is assumed that the cable is drawn out to the outside of a housing range (entire length of the rotating shaft in the axial direction), when the origin is defined as a location where the driving motor and the cable are connected to each other, and when the end point is defined as an end portion of the housing (more specifically, an end portion of the housing in the cable drawing out direction with regard to the axial direction of the rotating shaft).

The outside diameter of the indexing apparatus is caused to match the outside diameter of the housing in the following way.

That is, the wiring hole of the housing (30) receives the entire length in the drawing-out direction of the cable.

For the driving means, any number of drive motors may be used. Therefore, one drive motor may be used, or a plurality of drive motors may be disposed in series so as to be spaced apart from each other in the axial direction of the rotating shaft. If a plurality of drive motors are disposed in series so as to be spaced apart from each other in the axial direction of the rotating shaft, it is possible to provide a torque that is larger than that of one drive motor without increasing the outside diameter of the housing. When a plurality of drive motors are disposed in this way, it is difficult to pass the cable, connected to the drive motor positioned upstream with reference to the drawing out direction of the cable, between the rotating shaft and the housing because a downstream drive motor gets in the way. In such a case, it is desirable to perform the following to prevent, for example, damage to the cable.

That is, locations where the wiring holes of the cables are formed are situated at outer sides of the downstream drive motors in the housing, the cables being connected to the upstream drive motors with reference to the drawing-out direction of the cables.

The housing may have either an integral structure or a structure in which portions thereof are connected to each other so that they can be divided from each other. However, to facilitate the formation of the wiring holes, it is desirable to provide the following structure.

That is, in the housing, a plurality of housing members are connected to each other so as to be capable of being divided from each other in the axial direction of the rotating shaft, the housing members being made to correspond to the plurality of the drive motors and individually surrounding outer peripheries of the drive motors; and the wiring holes of the cables, connected to the upstream drive motors with reference to the drawing-out direction of the cables, are formed at the housing members corresponding to the downstream drive motors.

Advantages

Even if the cable cannot be drawn out by passing it through a portion between the housing and the rotating shaft due to a component accommodated in the housing, a wiring hole into which at least an upstream portion in the drawing out direction of the cable is inserted is provided in the thick-walled internal portion of the outer tube of the housing along the axial direction of the rotating shaft. Therefore, it is possible to prevent damage to the cable compared to a structure in which the entire cable is drawn out to the outer side of the housing.

In the invention of Claim 2, the wiring hole of the housing receives the entire length in the drawing out direction of the cable. Therefore, it is possible to prevent the outside diameter of the housing of the indexing apparatus from increasing. Consequently, it is possible to perform mounting and removal with respect to an existing machine tool without any difficulty.

In the invention of Claim 3, even if the plurality of drive motors are provided so as to be spaced apart from each other in the axial direction, the locations where the wiring holes of the cables, connected to the upstream drive motors with reference to the drawing out direction of the cables, are formed are situated at the outer sides of the downstream drive motors in the housing. Therefore, it is possible to effectively draw out the cables without interfering with the downstream drive motors, to effectively prevent damage to the cables, and to effectively prevent an increase in size of a portion where the indexing apparatus is mounted and removed.

In the invention of Claim 4, since the wiring holes of the cables are formed in the housing members corresponding to the downstream drive motors, the wiring holes are easily formed.

REFERENCE NUMERALS 1 machine tool
2 head
3 column
4 cross rail
5 saddle
6 ram
7 table
8 processing head
9 spindle
10 spindle unit
11 first support head
12 base
13 casing
14 leg
20 second support head
30 housing
31 first housing member
31a body
31b first housing sleeve
31c outwardly facing window
32 second housing member
32a body
32b second housing sleeve
32c engagement stopping sleeve
32d spacer sleeve
32e outwardly facing window
c1 connector
c11 cable
H1 cable wiring hole
c2 connector
c21 cable
H2 cable wiring hole
c3 connector
c31 cable
H3 cable wiring hole
H21 draw out hole
H22 draw out hole
H23 draw out hole
40 rotating shaft
40a rotation detection shaft member
41 first shaft member
42 second shaft member
42a body
42b recessed portion
42c second shaft sleeve 42d connecting member
42e flange member
43 third shaft member
50 clamping mechanism
51 clamp sleeve
51a thick-walled portion
51b thin-walled portion
52 pressure-receiving member
53 pressure chamber
54 fluid path
54a exit portion
R rotary joint
R1 distributor
R1a flange portion
R2 shaft
R2a first shaft sleeve
R0 annular groove
R11 fluid path
R21 fluid path
B1 bearing
B2 bearing
B2a inner ring
B2b outer ring
B2c circular cylindrical roller
M1 drive motor
M1a motor rotor
M1b motor stator
M1c stator sleeve
M2 drive motor
M2a motor rotor
M2b motor stator
M2c stator sleeve
M3 drive motor
M3a motor rotor
M3b motor stator
M3c stator sleeve
60 rotation detector
61 detector stator
62 detector rotor

BEST MODES FOR CARRYING OUT THE INVENTION

Figure 7:
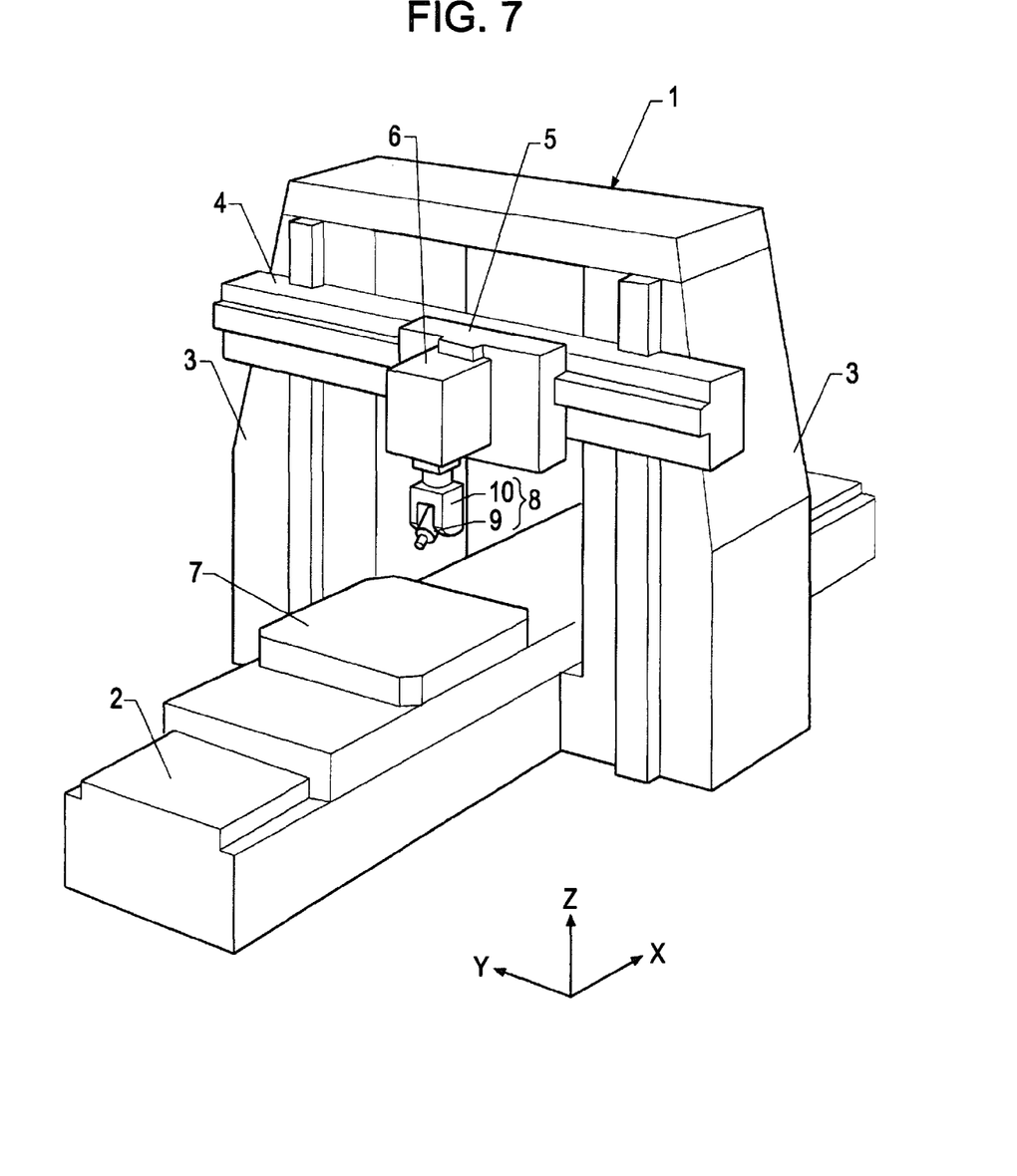
FIG. 7 is a perspective view of the entire machine tool.

In an example of a machine tool 1 to which the present invention is applied, as shown in FIG. 7, a gate-type machine tool (machining center) is used as a composite machining apparatus, such as a 5-axis machining apparatus or a multi-axis machining apparatus. The illustrated machine tool 1 is a machining apparatus capable of simultaneous 5-axis control; and includes, as a machine tool body, left and right columns 3 and 3, a cross rail 4, a saddle 5, a ram 6, and a table 7. The left and right columns 3 and 3 stand from respective sides of a head 2. The cross rail 4 is disposed at the columns 3 and 3 and moves vertically (in the direction of a Z axis) along one of front and back surfaces of each column 3. The saddle 5 moves horizontally towards the left and right (in the direction of a Y axis) along the front surface of the cross rail 4 (that is, along a side that is the same as that where the cross rail 4 is provided with respect to the columns 3). The ram 6 moves along the front surface of the saddle 5 in the direction of the Z axis. The table 7 moves along the upper surface of the head 2 in a front-back direction. In addition, a processing head 8 is removably mounted to the ram 6 of the machine tool body. A spindle unit 10 including a spindle 9 to which a tool is mounted is provided as one component of the processing head 8.

In such a machine tool 1, during processing of a workpiece, by numerical-value control based on a preset program, the table 7, the cross rail 4, the saddle 5, and the ram 6 are moved, and the processing head 8 indexes the angular position (rotation position) of the spindle unit 10. By this, in the gate-type machine tool, it is possible to abut the tool upon each processing surface of the workpiece at a suitable angle and to process the workpiece, and to, for example, cut and process the workpiece having a complicated shape.

Figure 6:
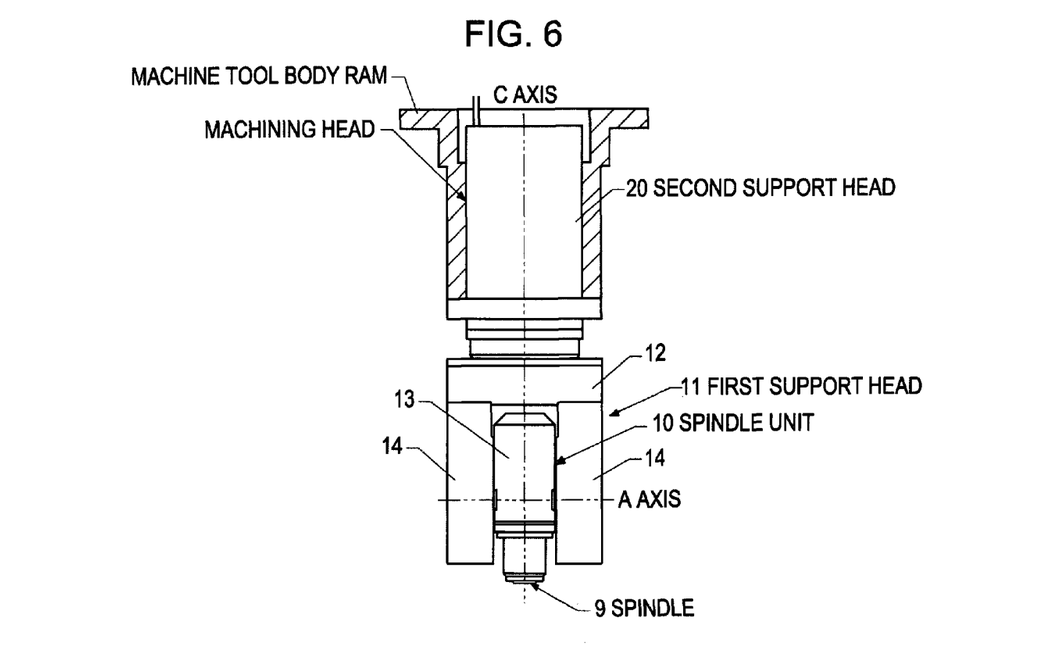
FIG. 6 is a schematic front view of a processing head.

As shown in FIG. 6, the processing head 8 includes the spindle unit 10, a first support head 11, and a second support head 20. The spindle unit 20 is provided with the spindle 9 to which a tool is mounted. The first support head 11 rotatably supports the spindle unit 10 in a state allowing angular adjustment. The second support head 20 rotatably supports the first support head 11 at a side opposite to the spindle unit 10. In addition, the first support head 11 (a base 12 of the first support head 11) corresponds to what is called a member that is rotationally driven in the invention of the application, and the second support head 20 corresponds to what is called the angular indexing apparatus in the invention of the application.

The spindle unit 10 is a spindle head having a motor built therein, and rotationally drives at a high speed the spindle 9, rotatably supported in a casing 13 thereof, by the built-in motor (not shown).

The first support head 11 rotatably supports the spindle unit 10 with an A axis as center, and, with a built-in motor, causes the spindle unit 10 to rotate around the axis (hereunder referred to as "A axis") that is orthogonal to an axial direction corresponding to a vertical direction (hereunder referred to as "C-axis direction") to index the angular position thereof. The C axis is parallel to a Z axis of the machine tool 1.

The first support head 11 has the shape of a fork in which a pair of legs 14 and 14 are mounted to the base 12 (portion at the side of the second support head 20) so as to be spaced apart (separated) from each other. The spindle unit 10 is supported between the pair of legs 14 and 14. More specifically, a pair of support shafts (not shown), rotatably supported in the interiors of the respective legs 14 and disposed so that their rotational axes match the A axis, are mounted to the respective side surfaces of the spindle unit 10. By the support shafts, the spindle unit 10 is rotatably supported between the pair of legs 14 and 14. In addition, by rotationally driving the support shafts by a motor built in the leg 14, the spindle unit 10 is rotated around the A axis as center, to index its angular position.

The second support head 20 supports the first support head 11 so that the first support head 11 rotates around the C axis as center, rotates the first support head 11 by a built-in driving means, and indexes its angular position, to index the angular position of the spindle unit 10. The second support head 20 is mounted to the ram 6 of the machine tool 1, and has the first support head 11 mounted to one end thereof. In the description below, each part of the second support head 20 basically has a cylindrical shape or an annular shape with the C axis as the axis. In addition, the term "connect" means that fastening and securing with, for example, screws or bolts.

Figure 1:
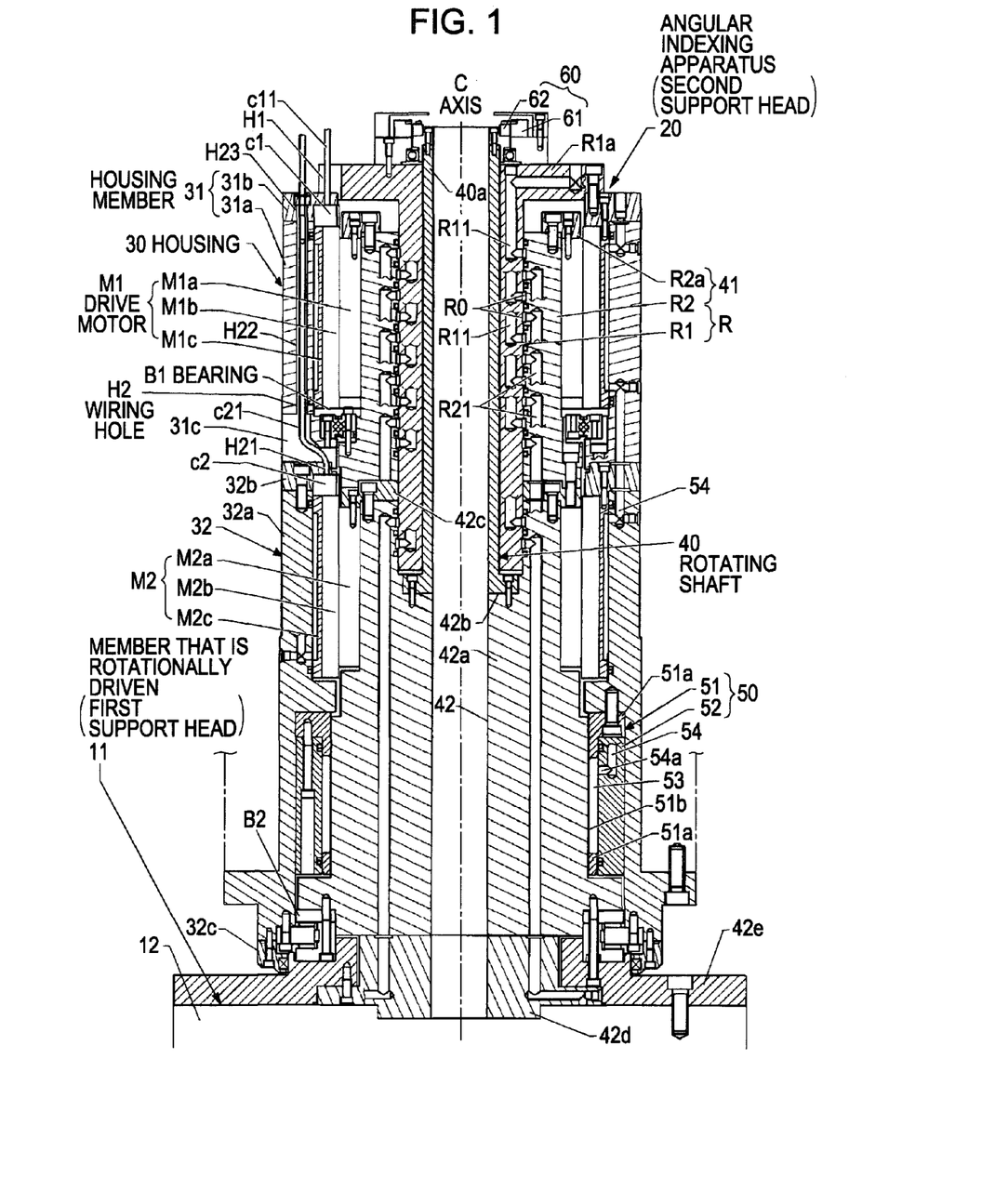
FIG. 1 is a sectional view of an embodiment of an angular indexing apparatus for a machine tool.

As shown in FIG. 1, the second support head 20 includes a housing 30, a rotating shaft 40, bearings B1 and B2, driving means M1 and M2, and a clamping mechanism 50 (which holds the rotating shaft 40 so as to be incapable of rotating). The rotating shaft 40 is rotatably supported in the interior of the housing 30. The bearings B1 and B2 are interposed between the housing 30 and the rotating shaft 40. The driving means M1 and M2 are similarly interposed between the housing 30 and the rotating shaft 40. The clamping mechanism 50 is similarly interposed between the housing 30 and the rotating shaft 40. The driving means M1 and M2 and the bearings B1 and B2 are plural in number, and are disposed in series so as to be spaced apart from each other in the C axis direction. In the embodiment, a cross roller bearing is used for the bearing B1 at a side (upper side) opposite to the member that is rotationally driven, and a multiple-row roller bearing capable of supporting an axial load and a radial load is used for the bearing B2 at the side of the member that is rotationally driven (lower side).

The driving means M1 and M2 rotationally drive the rotating shaft 40 with respect to the housing 30 secured to the machine tool 1, and driving motors M1 and M2 are used therefor. Each of the driving motors M1 and M2 is a type that is operated by directly connecting it to a load without using a decelerator such as a gear (this type is popularly called a direct-drive motor/DD motor). The drive motors M1 and M2 include motor stators M1$b$ and M2$b$, motor rotors M1$a$ and M2$a$, and stator sleeves M1$c$ and M2$c$, respectively, all of which are concentrically disposed. The motor stators M1$b$ and M2$b$ are formed by winding coils around fixed iron cores. In the motor rotors M1$a$ and M2$a$, a plurality of opposing magnets disposed close to the inner peripheral surfaces of the respective motor stators M1$b$ and M2$b$ are disposed in a peripheral direction. The stator sleeves M1$c$ and M2$c$ hold the motor stators M1$b$ and M2$b$, respectively.

The housing 30 primarily includes housing members 31 and 32, and a distributor R1 of a rotary joint R. The housing 30 can be divided in the C axis direction, and includes the housing member 31 and the housing member 32 in the figure. Regarding the housing members 31 and 32, the illustrated upper housing member 31 is a first housing member, and the lower housing member 32 is a second housing member. The outside diameter of the distributor R1 is less than the inside diameter of the first housing member 31. The first housing member 31 and the second housing member 32 are connected to each other in the form of a vertically long cylinder. The distributor R1 is concentrically disposed so as to be spaced apart from the inner peripheral side of the first housing member 31. An outer peripheral portion of a flange portion R1$a$, which projects radially outward from the upper end of the distributor R1, is connected to an upper end portion of the first housing member 31. That is, the first housing member 31 and the second housing member 32 form an outer cylinder, a portion of the distributor R1 excluding the flange portion R1$a$ forms an inner cylinder, and the flange portion R1$a$ forms a cover that covers one end of the outer cylinder and one end of the inner cylinder. By this, a space is formed between the first housing member 31 and the distributor R1, a space is formed at the inner peripheral side of the distributor R1, and a space is formed at the inner peripheral side of the second housing member 32 for communication therewith. The rotating shaft 40, the bearings B1 and B2, and the drive motors M1 and M2 are disposed in these spaces.

A body 31$a$ of the first housing member 31 has an L shape in cross section at one side thereof, the L shape being formed by inwardly bending a lower end portion of the body 31$a$. A first housing sleeve 31$b$, which projects radially inward towards the distributor R1, is connected to an upper end portion of the body 31$a$. The cross section at one side of the body 31 has overall a U shape that opens inwardly.

The rotary joint R includes the cylindrical distributor R1 and a cylindrical shaft R2 having different diameters. The distributor R1 and the shaft R2 are rotatably fitted to each other in the form of a double tube. Here, the shaft R2 is fitted to the outer side of the distributor R1. A plurality of fluid paths R11 and R21 are formed at the distributor R1 and the shaft R2, respectively, so that they are positionally shifted from each other in a circumferential direction. Annular grooves R0, which communicate with the fluid paths R11 and R21, are formed in a fitting peripheral surface between the distributor R1 and the shaft R2. By virtue of this structure, even if the distributor R1 and the shaft R2 rotate relative to each other, the state of communication between the fluid paths R11 of the distributor R1 and the fluid paths R21 of the shaft R2 is maintained. The fluid paths R11 of the distributor R1 are formed so as to communicate with the outside at the flange portion R1$a$, and the flow paths R21 of the shaft R2 are formed so as to communicate with the first support head 11.

A second housing sleeve 32$b$, which projects radially inward, is connected to an upper end portion of a body 32$a$ of the second housing member 32, and an engagement stopping sleeve 32$c$, which projects radially inward, is connected to a lower end portion of the body 32$a$ of the second housing member 32. In addition, the second housing member 32 is secured to the first housing member 31 by connecting the second housing sleeve 32$b$ to the lower portion of the first housing member 31.

Although, in the foregoing description, the second housing sleeve 32$b$ is a portion of the second housing member 32, the second housing sleeve 32$b$ may be a portion of the first housing member 31. This is because, since the primary purpose of the second housing member 32 is to surround an area at the outer side of the lower drive motor M2, and the body 32$a$ is a portion for achieving this purpose, a particular problem is provided even if the second housing sleeve 32$b$ is formed as a portion surrounding an area that is slightly displaced from the outer side of the drive motor M2, that is, even if the second housing sleeve 32$b$ is formed as a portion of the first housing member 31 instead of as a portion of the second housing member 32.

The rotating shaft 40 primarily includes cylindrical shaft members 41, 42, and 40$a$, and can be divided in the C-axial direction at locations corresponding to a dividing location of the housing 30. In the figure, the rotating shaft 40 can be divided in two in the C-axis direction. The shaft member 41, disposed in the space between the first housing member 31 and the distributor R1, is a first shaft member. The shaft member 41, disposed in the space at the inner peripheral side of the second housing member 32, is a second shaft member. The shaft member 40$a$, disposed in the space at the inner peripheral side of the distributor R1, is a rotation detection shaft member. In addition, the rotation detection shaft member 40$a$ and the first shaft member 41, which are disposed at the inner and outer sides of the distributor R1, respectively, are abutted upon and connected to the upper end of the second shaft member 42 with the C axis as center. The first shaft member 41 and the second shaft member 42 can be divided at a location corresponding to the dividing location of the housing 30.

The body of the first shaft member 41 corresponds to the shaft R2 of the rotary joint R. The first shaft member 41 is formed so that the lower portion of the shaft R2 projects radially outward so as to face the lower portion of the first housing member 31, and so that a first shaft sleeve R2$a$, which projects radially outward, is connected to the upper portion of the shaft R2. In addition, one drive motor M1 and one bearing B1 are disposed in a cylindrical space between the first shaft member 41 and the first housing member 31, and the bearing B1 is disposed beneath the drive motor M1. That is, the upper bearing B1 is disposed between the upper drive motor M1 and the lower drive motor M2.

An outer peripheral portion (outer ring) of the upper bearing B1 (cross roller bearing) is connected to the lower portion of the first housing member 31, and an inner peripheral portion (inner ring) of the upper bearing B1 is connected to the lower portion of the first shaft member 41.

In the upper drive motor M1, the motor stator M1$b$ is secured to the inner peripheral side of the first housing member 31 through the stator sleeve M1$c$, and the motor rotor M1$a$ is secured to the outer peripheral side of the first shaft member 41. More specifically, the motor stator M1$b$ is concentrically fitted and secured to an inner peripheral surface of the stator sleeve M1$c$, and the stator sleeve M1$c$ is connected to the lower side of the first housing sleeve 31$b$ to secure the motor stator M1$b$ to the first housing member 31. The motor rotor M1$a$ is fitted to the outer peripheral surface of the first shaft member 41 (the shaft R2 of the rotary joint R), and is connected to the lower surface of the first shaft sleeve R2$a$, to secure the motor rotor M1$a$ to the first shaft member 41.

A cable c11 is connected to the upper drive motor M1 through a connector c1. The cable c11 is, for example, a current supply cable for a U phase, a V phase, or a W phase for supplying current to a coil built in the motor stator; a ground wire; or a detection wire for detecting abnormality of the drive motor M1. For disposing the connector c1, a space that is locally recessed in a portion of the lower surface of the first housing sleeve 31$b$ is formed. The connector c1 is disposed in the recessed space. A cable wiring hole H1 extending vertically through the first housing sleeve 31$b$ is provided therein for passing the cable c11 therethrough.

In the second shaft member 42, a recessed portion 42$b$ is formed in the center portion of the upper end surface of a body 42$a$, and the lower portion of the distributor R1 and the lower portion of the rotation detection shaft member 40$a$ are disposed in the recessed portion 42$b$. The recessed portion 42$b$ has a stepped form in which the inside diameter of the upper portion thereof is larger than that of the lower portion thereof. An outer peripheral surface of the lower portion of the distributor R1 contacts the inner peripheral side of the upper portion of the recessed portion 42$b$, and an outer peripheral surface of the lower portion of the rotation detection shaft member 40$a$ contacts the inner peripheral side of the lower portion of the recessed portion 42$b$. The second shaft member 42 is provided with a second shaft sleeve 42$c$ connected to the upper portion of the body 42$a$ thereof and projecting radially outward. The second shaft sleeve 42$c$ is connected to the first shaft member 41 provided on the second shaft sleeve 42$c$.

The second shaft member 42 includes a flange member 42$e$, disposed at the lower side of the body 42$a$, and a connecting member 42$d$, disposed so as to sandwich the flange member 42$e$; and is formed so that, along with the flange member 42$e$, the connecting member 42$d$ is connected to the lower surface of the second shaft member 42. The lower end surface of the connecting member 42$d$ and the upper end surface of the base 12 of the first support head 11 are positioned with respect to each other by fitting a recess and a protrusion to each other.

By projecting the second shaft member 42 and the second housing member 32 inwardly and outwardly at proper locations, three annular spaces are formed between the members 42 and 32 so as to be vertically spaced apart from each other. The lower drive motor M2, the clamping mechanism 50, and the lower bearing B2 are separately disposed in the three spaces, respectively.

The lower drive motor M2 is disposed in the upper space among the three spaces. Similarly to the upper drive motor M1, the lower drive motor M2 includes a motor rotor M2$a$, a motor stator M2$b$, and a stator sleeve M2$c$, which are similarly secured to the second housing member 32 through the second housing sleeve 32$b$ or to the second shaft member 42 through the second shaft sleeve 42$c$.

A plurality of cables c21 are also connected to the lower drive motor M2 through a connector c2. For disposing the connector c2, a space that is locally recessed is formed in the lower surface of the second housing sleeve 32$b$. For passing the cable c21 through the entire length in a drawing out direction, a cable wiring hole H2 is formed along an axial direction in a thick-walled internal portion of the outer cylinder of the housing 30 so as to communicate therewith. More specifically, the wiring hole H2 has a draw out hole H21 of the second housing sleeve 32$b$, a draw out hole H22 of the body 31$a$, and a draw out hole H23 of the first housing sleeve 31$b$. Further, an outwardly facing window 31$c$ opening into the cables c21 is formed in the outer periphery of the lower end portion of the body 31$a$. The outwardly facing window 31$c$ is a portion of the draw out hole H22 of the body 31$a$.

The outwardly facing window 31$c$ is used when passing the cables c21 through the cable wiring hole H2 after connecting the first housing member 31 and the second housing sleeve 32$b$ to each other. Of the wiring hole H2, the draw out hole H21 of the second housing sleeve 32$b$ and the draw out hole H22 of the first housing member 31 are disposed inwardly and outwardly of each other, respectively, with the C axis as center. By bending the cables c21 and forming a cable drawing-out space by the outwardly facing window 31$c$, a stress that is exerted upon the cables c21 is reduced.

Figure 2:
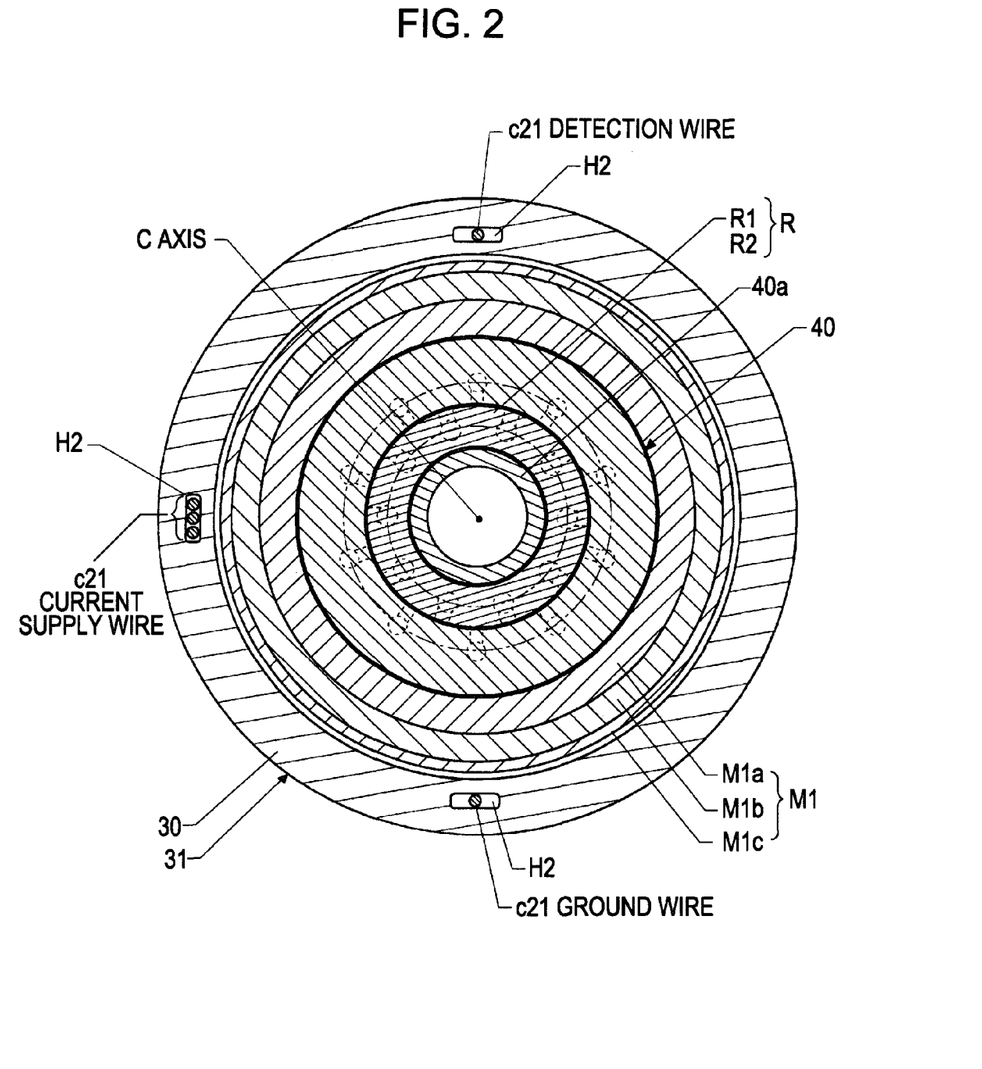
FIG. 2 is a transverse sectional view of the main portion of FIG. 1.

Although one wiring hole H2 may be provided for receiving together, for example, a detection wire, a ground wire, and three current cables for a U phase, a V phase, and a W phase, in FIG. 2, wiring holes H2 are formed in accordance with types of the cables c21 (the current supply wires, the ground wire, and the detection wire) so as to be spaced apart from each other in the circumferential direction. Since the space for the detection wire is formed so as to be separated from those of the other cable types, introduction of noise into the detection wire can be effectively prevented from occurring. Although not illustrated, a dedicated hole may be provided with every wire for inserting the corresponding wire therein. In the figure, the aforementioned upper wiring hole H1 and lower wiring hole H2 are positionally shifted from each other so that the upper cable c11 and the lower cables c21 do not interfere with each other.

The clamping mechanism 50 is disposed in the middle space among the three spaces. The clamping mechanism 50 includes a clamp sleeve 51, which relatively compresses the rotating shaft 40 so that the rotating shaft 40 is incapable of rotating relatively, and a pressure-receiving member 52, which guides fluid for deforming the clamp sleeve 51. The pressure-receiving member 52 and the clamp sleeve 51 are successively concentrically disposed at the inner peripheral side of the second housing member 32 so as to be connected to each other. The clamp sleeve 51 has a groove at its outer periphery. By the groove, a deformable thin-walled portion 51$b$ is formed between an upper thick-walled portion 51$a$ and a lower thick-walled portion 51$a$. By the groove and the pressure-receiving member 52, a pressure chamber 53 is formed between the outer side of the thin-walled portion 51$b$ and the pressure-receiving member 52. The clamp sleeve 51 is disposed by disposing the thin-walled portion 51$b$ near the second shaft member 42. Further, a fluid path 54 communicating with the pressure chamber 53 is formed in the interior of the pressure-receiving member 52. An exit portion 54$a$ of the fluid path 54 opens into the pressure chamber 53. The fluid path 54 is formed in the housing members 31 and 32, and communicates with a fluid path (not shown) that communicates with the outside at the housing sleeve 31$b$. By supplying fluid into the fluid path 54, the thin-walled portion 51$b$ is deformed in a small-diameter direction and the second shaft member 42 is compressed to keep the rotating shaft 40 in a state in which it is incapable of rotating.

Figure 5:
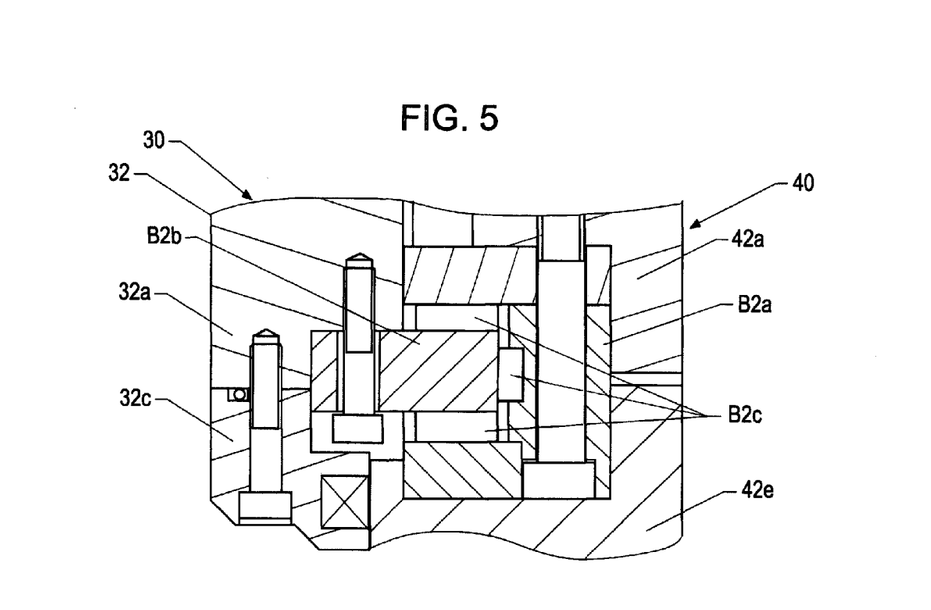
FIG. 5 is an enlarged sectional view of a multiple-row roller bearing.

The lower bearing B2 is specifically a triplex-row roller bearing (also called a triplex-row circular cylindrical roller bearing/axial radial roller bearing). More specifically, as shown in FIG. 5, the bearing B2 (triplex roller bearing) includes an inner ring B2a, an outer ring B2b, and a plurality of circular cylindrical rollers B2c interposed between the inner ring B2a and the outer ring B2b. By assembling a plurality of parts, the inner ring B2a is formed so as to have a U shape in cross section at one side and so as to open outwardly. An inner peripheral portion of the outer ring B2b is disposed at an intermediate portion in a height direction of a grooved portion of the inner ring B2a that opens. The inner ring B2a and the outer ring B2b are connected to the rotating shaft 40 and the housing 30, respectively. The circular cylindrical rollers B2c are disposed at the upper side, the lower side, and the inner side of the outer ring B2b, respectively. An axial load is supported by the upper and lower circular cylindrical roller B2c and B2c, and a radial load is supported by the inner circular cylindrical roller B2c. The inner circular cylindrical roller B2c is held by a holding member (not shown).

A rotation detector 60 for detecting an amount of rotation of the rotating shaft 40, that is, an angular position of the first support head 11 is secured to the upper end of the rotating shaft 40 (rotation detection shaft member 40a) and the housing 30 (distributor R1) through, for example, bearings. In the rotation detector 60, a detector stator 61 is secured to the distributor R1, and a detector rotor 62 is secured to the upper end portion of the rotation detection shaft member 40a. A detection signal of the rotation detector 60 is transmitted to a controlling device of the machine tool 1, and is used to control the rotation of the first support head 11.

A member to which the processing head according to the embodiment is mounted is the ram 6 of the body of the gate-type machine tool as shown in FIGS. 6 and 7. The second support head 20 is inserted into and mounted to the interior of the ram 6. Therefore, the outside diameter of the second support head 20 is limited by the shape of the ram 6. In the embodiment, the structure in which two drive motors, that is, the drive motors M1 and M2 are provided in the interior of the second support head 20 so as to be vertically spaced apart from each other is the basic structure. A consideration is made so that the cables c21 for the lower drive motor M2 pass through the wiring hole H2 in the thick-walled internal portions of the outer cylinder of the housing 30 over the entire length in the drawing-out direction of the cables c21. Therefore, it is possible to mount the second support head 20 to the ram 6 as it is; the cables c21 do not contact, for example, the ram 6; it is possible to prevent damage to the cables c21; and a mounting operation can be quickly carried out. Incidentally, when the structure in which two drive motors, that is, the drive motors M1 and M2 are provided in the interior of the second support head 20 so as to be vertically spaced apart from each other is the basic structure as in the embodiment, the upper drive motor M1 gets in the way when drawing out the cables c21 upward from the lower drive motor M2. Therefore, ordinarily, the cables c21 can only be drawn out upward after passing them sideways to the outer side of the housing 30. When the cables c21 are drawn out upward by passing them sideways to the outer side of the housing 30 from where they are set at the lower drive motor M2, an overall outside diameter is increased in correspondence with the cables c21. Moreover, it becomes difficult to mount a protective cover of the cables c21 at the outer side of the housing 30 because the outside diameter of the second support head 20 is limited by the shape of the ram 6. Further, when the second support head 20 is mounted without a protective cover, the cables c21 may become damaged. When an operation is carried out while paying attention not to damage the cables c21, it takes time to carry out the operation.

Figure 3:
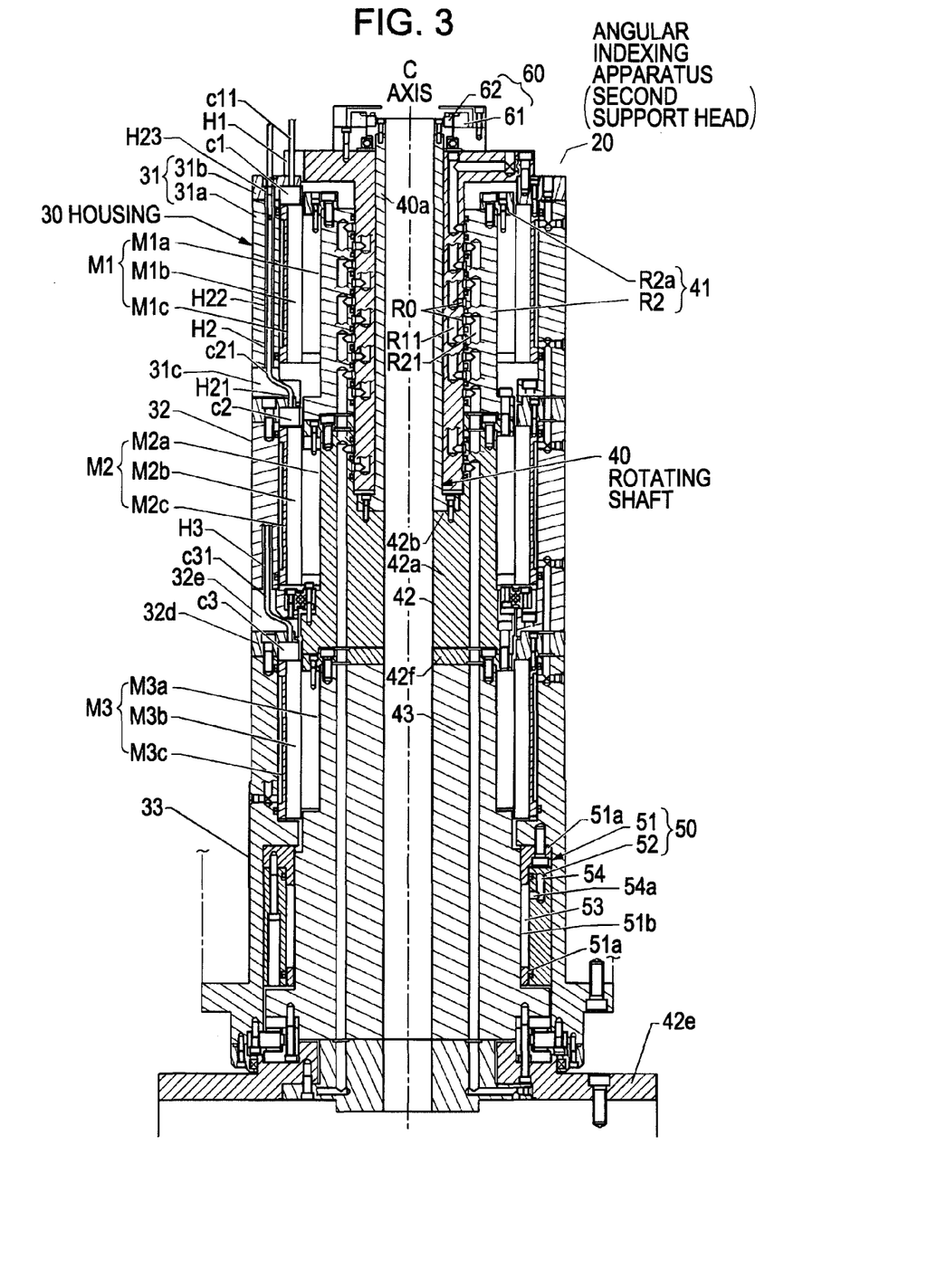
FIG. 3 is a sectional view of another embodiment of an angular indexing apparatus for a machine tool.

FIG. 3 shows a second support head 20 according to another embodiment. This is an embodiment in which three drive motors, that is, drive motors M1, M2, and M3 are disposed in series between a housing 30 and a rotating shaft 40 so as to be spaced apart from each other in a C-axis direction. Even in this embodiment, the housing 30 and the rotating shaft 40 can be divided in three in the C-axis direction in accordance with the locations where the drive motors M1, M2, and M3 are disposed. That is, in the second support head 20 shown in FIG. 2, three housings members, that is, housing members 31, 32, and 33 or the first housing member 31, the second housing member 32, and third housing member 33 are linearly connected to each other in the C-axis direction. The drive motors M1, M2, and M3, and a first shaft member 41, a second shaft member 42, and a third shaft member 43 are disposed in correspondence with each other at the inner sides of the respective housing members 31, 32, and 33. The first shaft member 41, the second shaft member 42, and the third shaft member 43 are connected to each other in a straight line along the C-axis direction.

The second shaft member 42 and the third shaft member 43 in this case are provided by dividing the second shaft member 42 according to the previous embodiment at the intermediate portion in the axial direction and connecting the divided portions to each other through a spacer shaft member 42f. The second housing member 32 and the third housing member 33 are formed by dividing the second housing member 32 according to the previous embodiment in the axial direction and connecting the divided portions to each other through a spacer sleeve 32d.

In the lowest drive motor M3, the disposition of a motor rotor M1a, a motor stator M3b, and a stator sleeve M3c is similar to that in the other drive motors M1 and M2. A connector c3, a cable c31, and a cable wiring hole H3 for the lowest drive motor M3 are provided similarly to those in the previous embodiment. A wiring hole H2 for the intermediate cable, and the wiring hole H3 for the lowest cable are positionally shifted from each other in a circumferential direction. An outwardly facing window 32e at the lower end portion of the second housing member 32 is provided similarly to an outwardly facing window 31c of the first housing member 31.

Further, the present invention is not limited to the above-described embodiments, so that various modifications can be made without departing from the scope of the claims.

The shapes (cross-sectional shapes) and dimensions of the wiring holes H1, H2, and H3 are not limited. For example, in FIG. 2, they are rectangular in cross section and have diameters that do not differ so much from the diameter of the cables c21. However, the shapes thereof may be circular shapes or other shapes, and the dimensions thereof may be, for example, those that allow easy insertion of the cables c21.

The wiring holes H2 and H3 are continuously provided along the C-axis direction from the locations where the lower drive motors M2 and M3 are set to the upper end of the housing 30 (at a side opposite to a member that is rotationally driven), respectively. Therefore, the exits of the wiring holes H2 and H3 corresponding to the locations where the cables c21 and c31 are drawn out correspond to the upper end of the housing. However, other forms may be used. For example, it is possible to provide the wiring holes H2 and H3 along the C-axis direction from the locations where the lower drive motors M2 and M3 are set to locations situated between the drive motors M2 and M3 and the upper end of the housing 30, and to provide the exits of the wiring holes H2 and H3 at the outer peripheral surface of the outer cylinder of the housing 30. Even in this case, upstream portions of the cables c21 and c31 in the drawing-out direction are passed through the wiring holes H2 and H3. Therefore, it is possible to overcome various problems such as damage to the cables c21 and c31 in this case than in an ordinarily conceivable structure (in which the exits of the wiring holes are provided at the outer peripheral surface of the housing 30 and near the locations where the lower drive motors are set).

Figure 4:
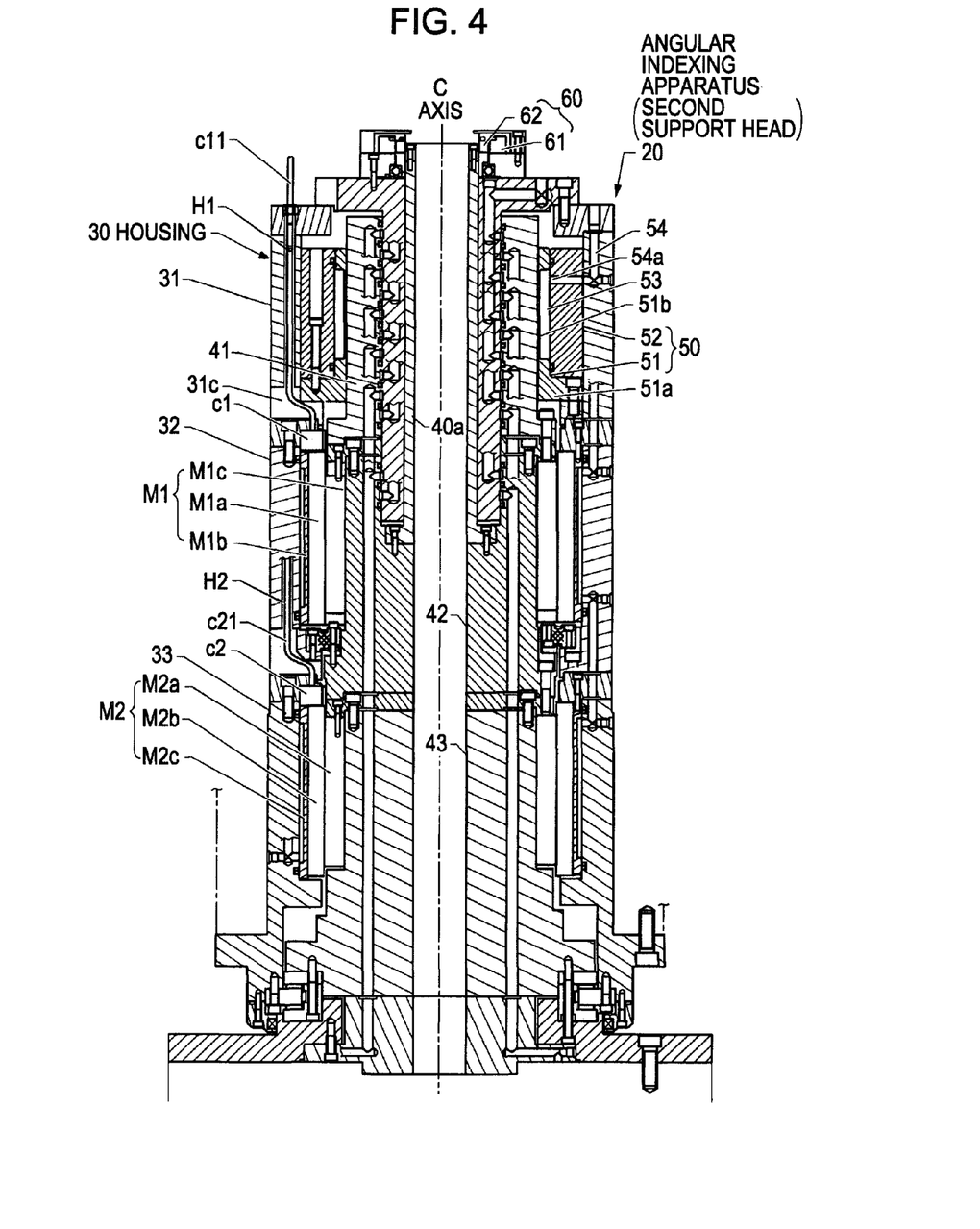
FIG. 4 is a sectional view of a modification of the angular indexing apparatus for the machine tool.

In addition, in the previous embodiments, the shaft R2 of the rotary joint R is used as the first shaft member 41 to which the motor rotor M1a of the drive motor M1 is secured. In addition, the drive motors M1, M2, and M3 are disposed at the outer sides of the first shaft member 41, and the other shaft members 42 and 43 in correspondence therewith. Further, the clamping mechanism 50 is disposed at the outer side of one of the shaft members 42 and 43. However, as shown in FIG. 4, it is possible to separately dispose the clamping mechanism 50 at the outer side of the shaft R2 (first shaft member 41) of the rotary joint R, and to dispose the drive motors M1 and M2 at the outer sides of the second shaft member 42 and the third shaft member 43, respectively. In this case, the wiring holes H1 and H2 are provided in the thick-walled internal portions of the first housing 31 positioned at the outer side of the clamping mechanism 50.

Although not shown, when the rotating shaft 40 includes the first to third shaft members 41, 42, and 43, and when two drive motors M1 and M2 are provided, it is possible to separately dispose the clamping mechanism 50 at the outer side of the second shaft member 42 and to dispose the drive motors M1 and M2 at the outer side of the first shaft member 41 and the outer side of the third shaft member, respectively.

The way in which the housing 30 and the rotating shaft 40 can be divided is not limited to that in which they can be divided in correspondence with the drive motors M1, M2, and M3 as in the embodiments. They may be divided independently of the drive motors M1, M2, and M3. For example, in the structure in which the housing 30 is provided with two drive motors M1 and M2, when the housing 30 is divided in two, both of the drive motors M1 and M2 may exist in one of the housing members 31 and 32 (in an assembled state) and, for example, the clamping mechanism 50 may exist in the other of the housing members 31 and 32. In the structure in which the housing 30 is provided with two drive motors M1 and M2, when the housing 30 is divided in three, the drive motor M1 may exist in the two housing members 31 and 32 that are connected to each other, and, for example, one drive motor M2 and one clamping mechanism 50 may exist in the remaining housing member 33. Further, the rotating shaft 40 and the housing 30 may have continuous integral structures which are incapable of being divided. This also applies to the rotating shaft 40.

The application of the angular indexing apparatus according to the present invention is not limited to, for example, the aforementioned 5-axis machining apparatus. For example, the angular indexing apparatus may be applied to a rotating table apparatus that rotationally drives a circular table on which a workpiece is placed and that indexes its angular position. When the angular indexing apparatus is used as a rotating table apparatus, the aforementioned circular table corresponds to what is called a member that is rotationally driven in the present invention.

Further, according to the angular indexing apparatus of the present invention, the number of drive motors that are used is not limited to those mentioned above, so that four or more drive motors may be disposed in series so as to be separated from each other in the axial direction.

The invention claimed is:

1. An angular indexing apparatus for a machine tool, including a rotating shaft, a housing, a bearing, driving means, and a clamping mechanism, a member that is rotationally driven being secured to one end of the rotating shaft, the housing at least surrounding an outer peripheral surface of the rotating shaft for supporting the rotating shaft, the housing being mountable to and separable from the machine tool, the bearing being provided between the housing and the rotating shaft, the driving means rotationally driving the rotating shaft to index an angular position of the rotating shaft, in which, as the driving means, a drive motor, including a motor rotor and a motor stator, is used, the motor rotor and the motor stator being coaxially disposed around the rotating shaft in the housing, the clamping mechanism maintaining the angular position indexed by the driving means so that the angular position is unrotatable,
 wherein the driving means includes a plurality of the drive motors disposed in series so as to be separated from each other in an axial direction of the rotating shaft, with the motor rotor of each drive motor being secured to the rotating shaft and the motor stator of each drive motor being secured to the housing,
 wherein the housing has wiring holes provided in a thick-walled internal portion of an outer cylinder surrounding the outer peripheral surface of the rotating shaft, the wiring holes receiving at least upstream portions in an entire length in a drawing-out direction of cables that are connected to the drive motors, and
 wherein the wiring holes for the cables, connected to upstream drive motors with reference to the drawing-out direction of the cables, are formed at portions of the housing corresponding to outer sides of downstream drive motors.

2. The angular indexing apparatus for the machine tool according to claim 1, wherein the wiring hole of the housing receives the entire length in the drawing-out direction of the cable.

3. The angular indexing apparatus for the machine tool according to claim 1, wherein, in the housing, a plurality of housing members are connected to each other so as to be capable of being divided from each other in the axial direction of the rotating shaft, the housing members being made to correspond to the plurality of the drive motors and individually surrounding outer peripheries of the drive motors, and
 wherein, the wiring holes of the cables, connected to the upstream drive motors with reference to the drawing-out direction of the cables, are formed at the housing members corresponding to the downstream drive motors.

* * * * *